Figure 1:
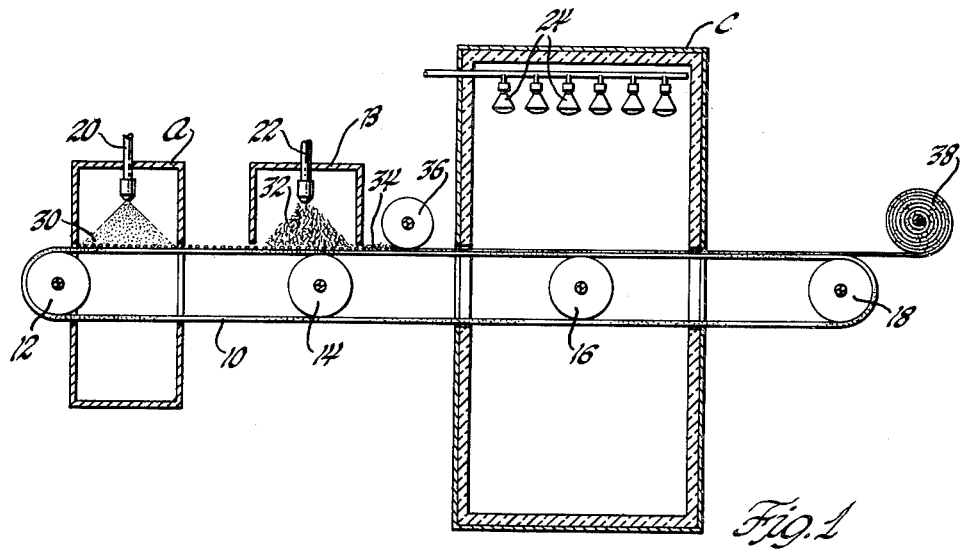

Oct. 19, 1965  T. E. LOHR  3,213,168
METHOD FOR MAKING ELASTIC FABRIC-LIKE SHEET MATERIAL
Filed Nov. 15, 1961

INVENTOR.
Thomas E. Lohr
BY
Peter P. Kozak
ATTORNEY

3,213,168
METHOD FOR MAKING ELASTIC FABRIC-LIKE SHEET MATERIAL

Thomas E. Lohr, Detroit, Mich., assignor to General Motors Corporation, Detroit, Mich., a corporation of Delaware
Filed Nov. 15, 1961, Ser. No. 152,462
3 Claims. (Cl. 264—70)

This invention relates to a fabric suitable for upholstery use and more particularly to a fabric formed of aluminum fibers and having elastic and yieldable properties.

Among the important properties required of upholstery fabrics for use in automobiles and the like are a high wear resistance and washability. Because conventional fabrics produced from plant or animal fibers have a relatively low wear resistance and may be readily stained, fabrics produced from synthetic fibers have become popular for use in automobile upholstery and have substantially replaced the fabrics produced from natural fibers. One of the significant disadvantages of the synthetic resin type fabrics is their lack of stretchability or elasticity and their failure to "breathe," so to speak, as do natural fabrics. Attempts have been made to produce fabrics from threads of aluminum. The lack of stretchability of these fabrics has in general discouraged their use in upholstery applications.

It is the basic object of this invention to provide a stretchable and elastic metal fabric having a high degree of wear resistance and response to conventional cleaning operations. It is a more specific object of this invention to provide a stretchable and elastic metal fabric which consists of a plurality of relatively short metal fibers angularly or randomly oriented relative to one another which are bound together at spaced intervals by an elastic or rubber-like adhesive. It is a further object of the invention to provide a method of manufacturing the stretchable metal fabric above referred to.

In general these and other objects of the invention are accomplished by first spraying, rolling or otherwise applying a realtively thin layer of a liquid rubber onto a sheet of Teflon or similar substance which is not wetted by the liquid rubber whereupon the liquid rubber forms into many small globules on the surface of the Teflon having substantially a random distribution and being relatively close to one another, and then a thin layer of relatively short aluminum fibers is sprayed over the globules of liquid rubber. The Teflon sheet supporting the superimposed rubber globules and metal fibers is then placed in an oven maintained at a curing temperature of the liquid rubber globules. As a consequence of the heating and curing operation the rubber globules are transformed into elastic discrete rubber particles which hold the metal fibers together at spaced intervals.

Figure 2:
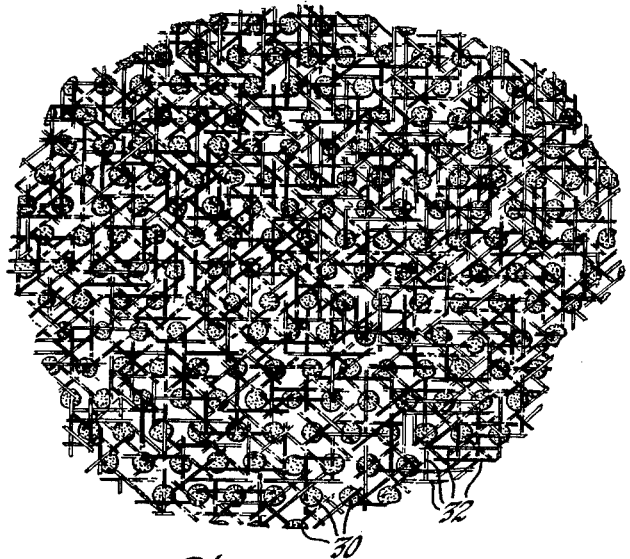

Other objects and advantages of the invention will become aparent from the following detailed description thereof, reference being had to the accompanying drawing, in which:

FIGURE 1 is a diagrammatic view of apparatus for carrying out the invention; and FIGURE 2 is a diagrammatic sketch of a fragment of the metal fabric of this invention.

Referring to FIGURE 1 of the drawings, the apparatus which may be used to carry out this invention includes a continuous or endless conveyor belt 10 preferably made of a fluorinated synthetic resin such as Teflon (polytetrafluoroethylene) which is not wetted by the liquid synthetic rubbers which will be hereinafter described. The conveyor belt 10 is carried on a series of rollers 12, 14, 16 and 18. The conveyor belt 10 is preferably made of a continuous sheet of Teflon (polytetrafluoroethylene). It may suitably be in the form of a fabric having the interstices thereof impregnated with polytetrafluoroethylene whereby the belt is provided with a non-wettable surface with respect to liquid rubbers used in connection with this invention. Preferably the belt has the width of a suitable bolt of cloth suitable for use in upholstering the interior of automobile bodies.

A first booth A is provided about the first section of the conveyor belt having positioned therein over the conveyor belt one or more spray guns 20 adapted for propelling a fine spray of a liquid rubber over a section of the conveyor belt 10 as shown. A second booth B is provided over an intermediate section of the conveyor belt containing one or more fiber spray guns 22 capable of uniformly and randomly dispersing a layer of fibrous metal such as aluminum or other suitable fibrous material over the conveyor belt within the booth B. Another portion of the conveyor belt is passed through an oven C provided with means for heating the surface of the upper side of the conveyor belt. Preferably a battery of infrared lamps 24 is arranged along the length and width of the conveyor belt to provide uniform heating thereof.

The process of the invention is carried out as follows. The conveyor belt 10 is caused to revolve slowly due to a rotation of the supporting rollers. Within the spray booth A a thin layer of a liquid rubber is sprayed over the Teflon surface of the conveyor belt. Suitable liquid rubbers for this purpose include the du Pont de Nemours & Company product sold under the trade name "Hypalon" having the formula

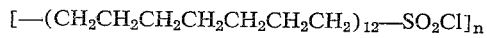
$$[-(CH_2CH_2CH_2CH_2CH_2CH_2CH_2)_{12}-SO_2Cl]_n$$

which is manufactured by treating polyethylene with chlorine and sulfur dioxide to form a white solid containing approximately 27% chlorine, 1.5% sulfur and a specific gravity of 1.1. The Hypalon is dissolved in an aromatic hydrocarbon solvent such as xylene whereby it may be applied to the conveyor belt by conventional liquid or paint spraying techniques. The Hypalon may be readily cured and converted into an elastomer by heating it to a temperature in the range of 300° F. to 400° F.

Another liquid rubber suitable for use in this invention is the well known heat curable neoprene (2-chloro-1,3 butadiene) dissolved in an aromatic solvent such as xylene. Still another liquid elastomer which may be prepared in a suitable liquid phase for spraying onto the Teflon conveyor belt is the du Pont de Nemours & Company product "Adiprene L" which is a linear isocyanate-terminated polymer containing aprroximately 4% reactive isocyanate. The fluid polymer is prepared from polytetramethylene ether glycol and toluene diisocyanate and has a molecular weight of approximately 2000 and a viscosity at 84° F. of 16,000 to 19,000 centipoises. The liquid polymer is composed of relatively small molecules which must be linked together to form the high molecular weight structures necessary for the tough elastomeric product. The substance is transferred from a liquid to a solid elastomer by a reaction of the terminal isocyanates with diamines and polyhydroxy compounds having two or more active hydrogens. The chain extension and cross-linking of the material is controlled by the time and temperature of curing and the amount and type of curing agent used.

Although the liquid rubber is sprayed by means of the spray gun 20 onto the conveyor belt 10 as a uniform layer, it forms on the Teflon surface as a large number of random dispersions of relatively small globules because the liquid rubber will not wet the Teflon surface. The normal vibration imparted to the conveyor belt by the rollers 12 and 14 has the effect of beating the liquid rubber into small globules.

The section of the conveyor 10 carrying the dispersion of rubber globules next moves into the booth B wherein a thin layer of metallic fibers 32 of aluminum are sprinkled or sprayed randomly over the globules 30 in a flocking operation. As the globule and flock layer 34 passes from the flocking booth B, it is preferably passed beneath a roller 36 which gently presses the fibers into the globules and embeds them therein. The flock-coated globules next pass into the curing oven C maintained at about 300° F. to 400° F. At this stage, if necessary, the belt is preferably vibrated by vibrating the roller 16 for the purpose of removing excess fibers. This may be accomplished by other suitable means as, for example, by an air jet applied across the conveyor belt. During its sojourn in the oven C the rubber globules are cured into a solid mass whereby the aluminum fibers are bound together at spaced intervals to provide a fabric-like structure having voids between the rubber globules whereby the cloth would have the capability of "breathing." After leaving the oven C the resulting fabric is rolled up on the reel 38.

The nature of the resulting cloth is indicated diagrammatically as a greatly enlarged view in FIGURE 2. Globules of the liquid rubber or adhesive 30 are dispered more or less equidistant from and close to one another and a layer of aluminum fibers 32 crisscross randomly and are connected by means of globules 30. It can readily be seen that the elastomeric character of the globules 30 provides the fabric with a capability of stretching. The spaces between the globules 30 are in the nature of voids through which air may pass whereby the fabric is provided with a capability of "breathing" or readily passing air therethrough.

Preferably the aluminum fibers used are about 1/16 to 1/4 inch in length and thread-like in thickness. A variation in the length and thickness of the fibers will, of course, result in fabrics of various coarseness or fineness as may be desired. The method of this invention may be readily adopted to form fabric-like structures in which the fibers are formed of other metals such as magnesium, copper, commercial aluminum yarn such as a thin aluminum foil laminated with synthetic resin films or various synthetic and natural fibers and mixtures of these materials.

The liquid adhesive or rubber may be applied to the Teflon surface by rolling or any other suitable means whereby a relatively thin uniform layer of the adhesive may be applied. Other highly fluorinated synthetic resins such as trifluoromonochloropolyethylene and similar fluorinated resins which are not wetted by the liquid rubber used may be satisfactorily employed.

Although the invention has been described in terms of certain specific embodiments, it is to be understood that others may be adopted and the invention is not to be limited thereby except by the following claims.

I claim:

1. A method for making fabric-like sheet material comprising the steps of applying a liquid synthetic rubber over the surface of a vibrating fluorinated synthetic resin surface, non-wettable by said liquid rubber whereby said rubber is dispersed over said surface in the form of a plurality of randomly distributed discrete globules, dispersing a layer of short fibers randomly over said surface and said globules whereby only portions of each of said fibers are imbedded in at least one of said globules and whereby said fibers are interconnected sufficiently to form a self-sustaining fabric-like material having voids between the fibers, heating said globules at a temperature and for a time sufficient to cure the same whereby the globules yieldably join said fibers to form a stretchable fabric-like material, and stripping said material from said surface.

2. A method for making a yieldable fabric-like metal sheet material comprising the steps of applying a liquid synthetic rubber over a flat surface of a vibrating fluorinated synthetic resin, non-wettable by said liquid rubber whereby said rubber is dispersed over said surface in the form of a plurality of randomly distributed discrete globules, dispersing a layer of short metal fibers randomly over said surface and said globules whereby only portions of each of said fibers are imbedded in at least one of said globules and whereby said fibers are interconnected sufficiently to form a self-sustaining metal fabric-like material having voids between the fibers, heating said globules at the curing temperature thereof to cure said globules whereby the globules yieldably join said fibers to form a stretchable fabric-like material, and stripping said material from said surface.

3. A method for making a yieldable aluminum fabric-like sheet material comprising the steps of spraying a liquid synthetic rubber over a flat surface of a vibrating fluorinated synthetic resin, non-wettable by said liquid rubber whereby said rubber is dispersed over said surface in the form of a plurality of randomly distributed discrete globules, dispersing a layer of short aluminum fibers randomly over said surface and said globules whereby only portions of each of said fibers are imbedded in at least one of said globules and whereby said fibers are interconnected sufficiently to form a self-sustaining aluminum fabric-like material having voids between the fibers, heating said globules at a temperature and for a time sufficient to cure the same whereby the globules yieldably join said fibers to form a stretchable aluminum fabric-like material, and stripping said material from said surface.

References Cited by the Examiner

UNITED STATES PATENTS

| | | |
|---|---|---|
| 1,861,003 | 5/32 | Foster. |
| 2,534,113 | 12/50 | Egger. |
| 2,568,144 | 9/51 | Cremer et al. |
| 2,574,849 | 11/51 | Talalay _____ 161—170 XR |
| 2,784,132 | 3/57 | Maisel _____ 161—170 |
| 3,050,427 | 8/62 | Slayter et al. |

EARL M. BERGERT, *Primary Examiner.*